United States Patent
Elvesjö

(10) Patent No.: US 10,134,197 B2
(45) Date of Patent: Nov. 20, 2018

(54) COMPUTER GRAPHICS PRESENTATION SYSTEMS AND METHODS

(71) Applicant: The Incredible Machine of Sweden AB, Stocksund (SE)

(72) Inventor: John Elvesjö, Stockholm (SE)

(73) Assignee: The Incredible Machine of Sweden AB, Stocksund (SE)

( * ) Notice: Subject to any disclaimer, the term of this patent is extended or adjusted under 35 U.S.C. 154(b) by 0 days.

(21) Appl. No.: 15/947,033

(22) Filed: Apr. 6, 2018

(65) Prior Publication Data

US 2018/0232957 A1    Aug. 16, 2018

Related U.S. Application Data

(63) Continuation of application No. 14/262,006, filed on Apr. 25, 2014, now Pat. No. 9,978,179.

(30) Foreign Application Priority Data

Apr. 26, 2013    (EP) ..................... 13165481

(51) Int. Cl.
*G06T 19/00*    (2011.01)
*G01B 11/00*    (2006.01)
(Continued)

(52) U.S. Cl.
CPC .......... *G06T 19/006* (2013.01); *G01B 11/002* (2013.01); *G01B 11/2513* (2013.01);
(Continued)

(58) Field of Classification Search
CPC ............... G06T 19/006; G01B 11/002; G01B 11/2513; G02B 27/017; G06F 3/012; G06F 3/0325; H04N 5/2256; H04N 5/23229
See application file for complete search history.

(56) References Cited

U.S. PATENT DOCUMENTS 5,657,163 A * 8/1997 Wu .................... G02B 6/4298
                                                          359/630
9,119,670 B2    9/2015 Yang et al.
(Continued)

FOREIGN PATENT DOCUMENTS

CN    105359061    2/2016
EP    2797313    10/2014
(Continued)

OTHER PUBLICATIONS

Linux Man Page KILL (1), Linux Programmer's Manual, Online Available at http://unixhelp.ed.ac.uk/CGI/man-cgikill, Oct. 14, 1994, 2 pages.
(Continued)

*Primary Examiner* — Jwalant Amin
(74) *Attorney, Agent, or Firm* — Kilpatrick Townsend & Stockton LLP

(57) ABSTRACT

A data processing unit generates graphics data that are sent to a display screen of a head-mountable structure worn by a user. Thereby, the user can observe the image data, which reflect a virtual reality environment implemented by the data processing unit, namely image data representing a field of view as seen by the user from a particular position and in a particular direction in the virtual reality environment. The head-mountable structure includes a first light source projecting a well-defined light pattern on a light-reflecting surface. The data processing unit is associated with an image registering unit recording image data representing the first well-defined light pattern. The data processing unit calculates the graphics data based on the image data.

20 Claims, 3 Drawing Sheets

(51) Int. Cl.
*G01B 11/25* (2006.01)
*G06F 3/03* (2006.01)
*G06F 3/01* (2006.01)
*H04N 5/232* (2006.01)
*H04N 5/225* (2006.01)
*G02B 27/01* (2006.01)

(52) U.S. Cl.
CPC ........... *G02B 27/017* (2013.01); *G06F 3/012* (2013.01); *G06F 3/0325* (2013.01); *H04N 5/2256* (2013.01); *H04N 5/23229* (2013.01); *G02B 2027/014* (2013.01); *G02B 2027/0187* (2013.01)

(56) References Cited

U.S. PATENT DOCUMENTS

| | | |
|---|---|---|
| 2005/0213081 A1 | 9/2005 | Hirahara |
| 2006/0244719 A1 | 11/2006 | Brigham, II et al. |
| 2010/0214214 A1* | 8/2010 | Corson ................. G06F 3/0325 345/158 |
| 2012/0224060 A1* | 9/2012 | Gurevich ................. B60R 1/00 348/148 |
| 2013/0060146 A1 | 3/2013 | Yang et al. |
| 2013/0300637 A1 | 11/2013 | Smits et al. |
| 2014/0320531 A1 | 10/2014 | Elvesjo |

FOREIGN PATENT DOCUMENTS

| | | |
|---|---|---|
| JP | 2004294138 | 10/2004 |
| JP | 2005017203 | 1/2005 |
| KR | 20160005720 | 1/2016 |
| WO | 2007114313 | 10/2007 |
| WO | 2014174109 | 10/2014 |

OTHER PUBLICATIONS

U.S. Appl. No. 14/262,006, Final Office Action dated Feb. 10, 2017, 24 pages.
U.S. Appl. No. 14/262,006, Final Office Action dated Feb. 21, 2017, 25 pages.
U.S. Appl. No. 14/262,006, Non-Final Office Action dated Jul. 29, 2016, 20 pages.
U.S. Appl. No. 14/262,006, Non-Final Office Action dated Jun. 29, 2017, 22 pages.
U.S. Appl. No. 14/262,006, Notice of Allowance dated Jan. 8, 2018, 6 pages.
European Application No. 13165481.6, Extended European Search Report dated Jul. 25, 2013, 9 pages.
European Application No. 13165481.6, Office Action dated Nov. 2, 2015, 8 pages.
Wienss et al., Sceptre an Infrared Laser Tracking System for Virtual Environments, ACM, 2 Penn Plaza, Suite 701—New York, USA, XP040051041, Nov. 1-3, 2006, pp. 45-50.

* cited by examiner

COMPUTER GRAPHICS PRESENTATION SYSTEMS AND METHODS

CROSS-REFERENCE TO RELATED APPLICATIONS

This application is a continuation of U.S. patent application Ser. No. 14/262,006 filed on Apr. 25, 2014, and entitled "COMPUTER GRAPHICS PRESENTATION SYSTEM AND METHOD," which claims priority to, and the benefit of, European Patent Application No. 13165481.6 filed on Apr. 26, 2013, and entitled "COMPUTER GRAPHICS PRESENTATION SYSTEM AND METHOD," the entire disclosures of which are hereby incorporated by reference, for all purposes, as if fully set forth herein.

BACKGROUND OF THE INVENTION

Embodiments of the present invention relates generally to computer graphics for computer-simulated environments, such as so-called virtual reality (VR) environments or any other graphics data capable of being presented on a display.

A VR environment simulates the physical presence of a user in places in the real world, or in an imaginary world, often in a highly visual three-dimensional (3D) manner. Most current VR environments are primarily visual experiences, displayed either on a computer screen or through special stereoscopic displays. However, some simulations include additional sensory information, such as sound through speakers or headphones. Haptic systems, for example for medical or gaming applications, may further include tactile information, generally known as force feedback. The user may interact with the VR environment via standard input devices such as a keyboard and mouse. In more advanced applications, multimodal devices such as a wired glove (or data glove) may be used.

A head-mounted display (HMD) system is preferably employed to provide the user with a realistic visual experience. Here, depending on how the user moves his/her head, the display presents graphics data that represent a field of view as seen by the user from a particular position and in a particular direction in the VR environment. The HMD system therefore requires that the user's head motions are tracked with high accuracy. Today, various forms of accelerometers and gyros are integrated into the HMD system for this purpose. However, this approach is associated with many problems.

As a start, a neutral, or origin position must be defined, which is linked to a particular position and direction for the user's field of view in the VR environment. Then, every movement in each direction and each rotation from the origin position must be tracked in order to determine how the field of view presented to the user shall be altered to maintain a consistent and realistic impression of the VR environment. This is a very challenging task, since parameters having six degrees of freedom (i.e. three spatial and three angular coordinates) must be kept up to date. Of course, over time, errors will be accumulated, such that eventually there is an unacceptably large disagreement between the field of view presented to the user via the graphics data and what actually should have been presented. These effects become especially pronounced if the user moves rapidly up/down, left/right, back/forth and/or angularly by for example shaking his/her head. Moreover, if for some reason, the motion tracking is lost, the system needs to be reset. I.e. the user must return to the origin position. In a gaming application, this may be annoying; whereas in a medical application (e.g. remote surgery), the consequences may be very critical indeed.

Today, there is no practically working alternative to the above-described accelerometer/gyro technology (which requires repeated updating and recoding of all positional and angular changes of the user's head) for providing control data to a computer so that the computer can generate adequate graphics data for presenting the VR environment to the user in a realistic manner, for instance via a HMD system.

BRIEF SUMMARY OF THE INVENTION

One object of the present invention is to alleviate the above problems, and thus offer an enhanced computer graphics presentation solution suitable for presenting a VR environment to a user.

According to one aspect of the invention, the object is achieved by the initially described computer graphics presentation system, wherein the head-mountable structure includes a first light source configured to project a first well-defined light pattern on a light-reflecting surface. The data processing unit is associated with an image registering unit configured to record image data representing the first well-defined light pattern. The data processing unit is arranged to calculate the graphics data based on the image data. The graphics data here represent a field of view as seen by the user from a particular position and in a particular direction in the virtual reality environment.

This computer graphics presentation system is advantageous because it enables the presentation of a field of view to a user interacting with a VR environment in a highly cost-efficient, reliable and robust manner.

According to one embodiment of this aspect of the invention, the data processing unit is configured to calculate the graphics data in real time based on image data recorded by the image registering unit at a single instance of time. Thus, determining the field of view does not require any historic position and/or direction data. Namely, given certain assumptions regarding the room in which the user is located, the image of the first well-defined light pattern provides an absolute reference regarding how the head-mountable is positioned and oriented. Based thereon, in turn, an appropriate field of view can then be generated.

According to another embodiment of this aspect of the invention, the computer graphics presentation system includes at least one input unit, which is configured to be manipulated by the user, and in response thereto, generate control commands for influencing the virtual reality environment implemented by the data processing unit. For example, a first input unit may be represented by a keyboard, an action button, a scroll wheel, a mouse, a touchpad, a joystick and/or a joyball. Further, the control commands generated thereby specify: moving the position from which the field of view is presented to the user in at least one dimension in the virtual reality environment; rotating the direction in which the field of view is presented to the user around at least one axis in the virtual reality environment; and/or manipulating at least one object in the virtual reality environment. Consequently, the field of view and the graphical objects presented to the user may be influenced by other factors than how the head-mountable structure is positioned and oriented. As a result, the VR environment may be dramatically manipulated by relatively simple means, and the user can conveniently observe all such manipulations via the display of the head-mountable structure.

According to yet another embodiment of this aspect of the invention, the computer graphics presentation system includes at least one input unit, which (analogous to the head-mountable structure) is provided with a light source configured to project a second well-defined light pattern on the light-reflecting surface. The image registering unit is also configured to record image data representing the second well-defined light pattern; and on the further basis of the image data representing the second well-defined light pattern, calculate the influencing of the virtual reality environment. For instance, the input unit may contain a pointing device configured to generate the control commands in response to how the input unit is positioned and/or oriented. The control commands generated thereby specify various manipulations of objects in the virtual reality environment. In other words, the input unit can implement a gun via which objects can be aimed and shot at in the VR environment. The proposed second well-defined light pattern associated with the input means renders it possible to simulate complex forms of interaction with very high authenticity at exceptionally low marginal cost.

According to still another embodiment of this aspect of the invention, the light sources are configured to emit light in the infrared spectrum. Thus, the projected light patterns can be made invisible to the human eye.

According to a further embodiment of this aspect of the invention, the light sources are configured to emit continuous light. This is advantageous because thereby the image registering unit does not need to be synchronized with the light sources; and consequently, the design can be made cost-efficient and robust.

According to another aspect of the invention, the object is achieved by the method described initially, wherein the head-mountable structure is presumed to contain a first light source and the data processing unit is associated with an image registering unit. The method further involves: projecting, via the first light source, a first well-defined light pattern on a light-reflecting surface; recording, via the image registering unit, image data representing the first well-defined light pattern; and calculating the graphics data based on the image data. The graphics data represent a field of view as seen by the user from a particular position and in a particular direction in the virtual reality environment. The advantages of this method, as well as the embodiments thereof, are apparent from the discussion above with reference to the proposed apparatus.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to control a computer to perform the method proposed above when the program is loaded into the computer.

Further advantages, beneficial features and applications of embodiments of the present invention will be apparent from the following description.

BRIEF DESCRIPTION OF THE DRAWINGS

Embodiments of the invention will now be explained more closely by means of various embodiments, which are disclosed as examples, and with reference to the attached drawings.

DETAILED DESCRIPTION OF THE INVENTION

Figure 1:
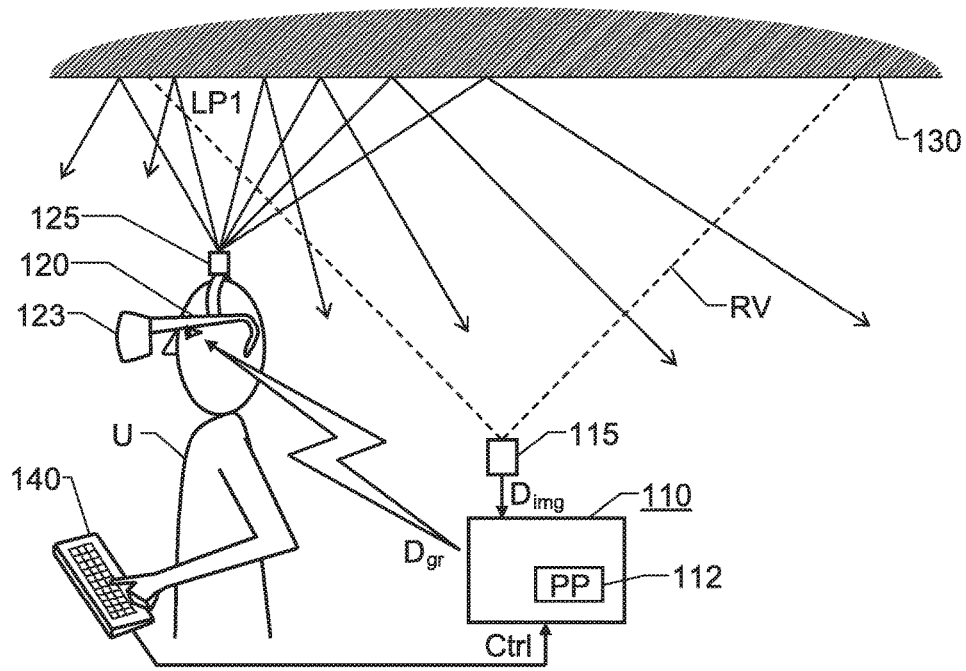
FIG. 1 shows a user interacting with a VR environment via a first input means and a head-mountable computer-graphics display structure according to one embodiment of the invention.

FIG. 1, shows a user U interacting with a VR environment implemented by a data processing unit 110 via a proposed computer graphics presentation system. Here, the user U employs a first input means 140 and a head-mountable structure 120 to interact with the VR environment. However, as will be discussed below with reference to FIG. 5, one or more second input means may also be connected to the data processing unit 110 for generating control commands Ctrl influencing the VR environment.

The head-mountable structure 120 carries a display screen 123, which is arranged such that when the head-mountable structure 120 is worn by the user U, image data $D_{img}$ presented on the display screen 123 is observable by the user U. The head-mountable structure 120 is communicatively connected with the data processing unit 110 (e.g. via a wireless link) and configured to receive the graphics data $D_{gr}$ from the data processing unit 110 there through.

Figure 2:
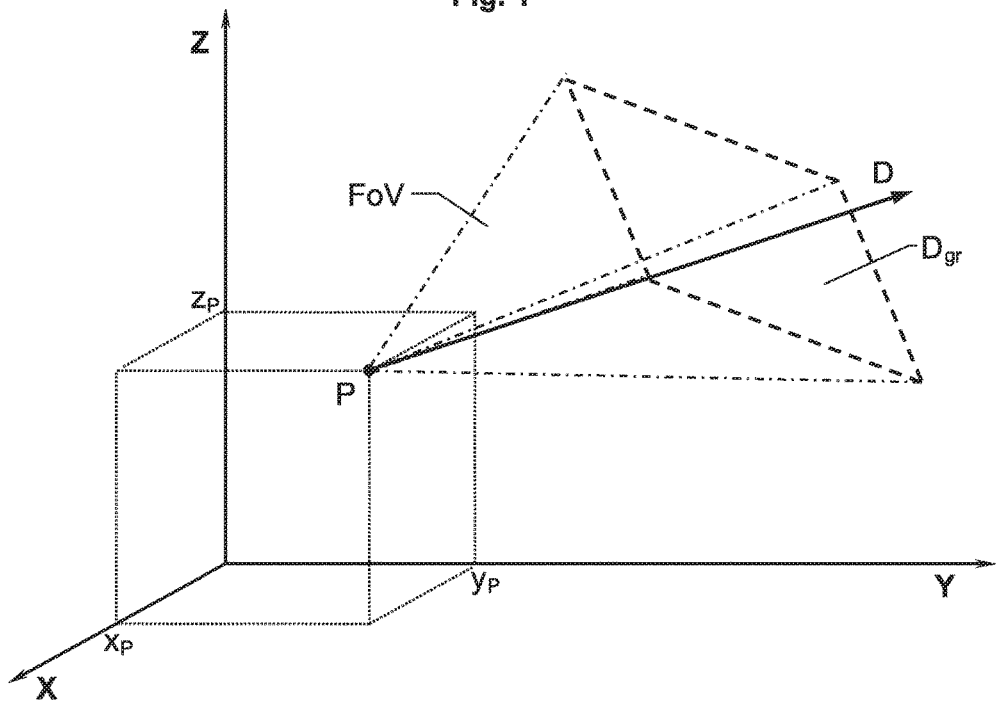
FIG. 2 illustrates how a field of view to be presented to the user is generated according to one embodiment of the invention.

The data processing unit 110 is configured to generate the graphics data $D_{gr}$ for presentation to the user U, where the graphics data $D_{gr}$ represent a field of view FoV as seen by the user U from a particular position P and in a particular direction D in the VR environment, see FIG. 2. The position P is designated by coordinates $x_P$, $y_P$ and $z_P$ in the VR environment. Correspondingly, the direction D is designated by three angles (not shown) relative to three axes X, Y and Z respectively in the VR environment.

According to the one embodiment of the invention, the graphics data $D_{gr}$ presented to the user U depend on the position P and the direction D. The parameters P and D, in turn, inter alia depend on how the user U positions and orients his/her head (or more precisely, the head-mountable structure 120). The parameters P and D may, however, also depend on control commands Ctrl generated via the first input means 140 and fed to the data processing unit 110. In other words, physical coordinates and directions in the room where the user U is located cannot generally be translated into (or mapped onto) coordinates P and directions D in the VR environment. In fact, the user U may keep his/her head completely stationary while entering control commands Ctrl, which causes one or both the parameters P and D to vary substantially (e.g. moving rapidly in a certain direction and/or rotating the entire VR environment around an axis).

In any case, all physical movements of the head-mountable structure 120 causes variations in one or both the parameters P and D. To register such movements, the head-mountable structure 120 includes a first light source 125 that is configured to project a first well-defined light pattern LP1 on a light-reflecting surface 130, for instance the ceiling of a room in which the user U is located.

Figure 3:
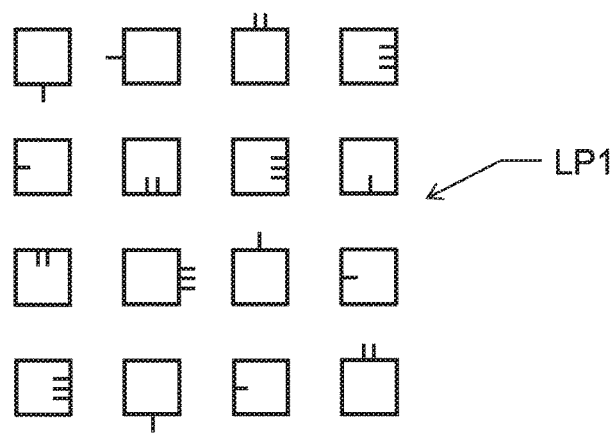
FIG. 3 shows an example of a well-defined pattern to be projected onto a light-reflective surface according to one embodiment of the invention.
Figure 4:
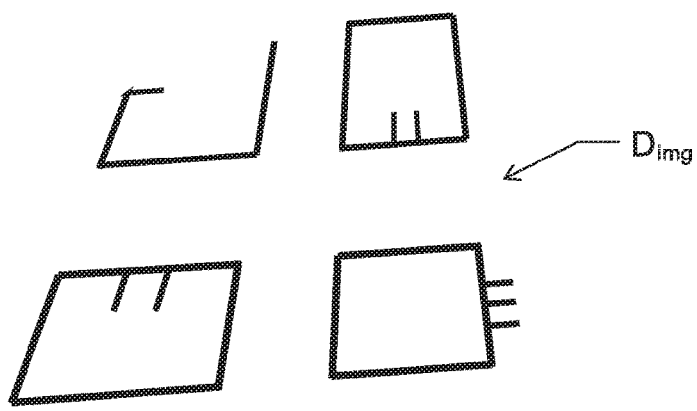
FIG. 4 illustrates how the image of the well-defined pattern in FIG. 3 may appear according to one embodiment the invention.

Moreover, the data processing unit 110 is associated with an image registering unit 115 that is configured to record image data $D_{img}$ representing the first well-defined light pattern LP1. The data processing unit 110 is further arranged to calculate the graphics data $D_{gr}$ based on the image data $D_{img}$. Referring to FIGS. 3 and 4, we will now explain how this calculation is carried out.

FIG. 3 shows an example of the first well-defined pattern LP1 to be projected onto the light-reflective surface 130. FIG. 3 represents the pattern LP1 as it appears in a perfectly perpendicular projection on a flat surface. Preferably, the pattern LP1 contains a plurality of elements being arranged in a nonrepeating manner for example as illustrated in FIG. 3. It is also advantageous if the elements of the pattern LP1 are such that any distortions thereof are uncomplicated to detect and quantify. It should be bore in mind, however, that essentially any nonrepeating pattern can be used as the pattern LP1. Hence, the pattern in FIG. 3 is merely a non-limiting example of one embodiment of the invention.

FIG. 4 illustrates how the pattern LP1 of FIG. 3 may appear in the image data $D_{img}$ when registered by the image registering unit 115. Here, the image data $D_{img}$ exclusively contains a sub-selection of the pattern LP1. Typically, this is the result of the fact that the user U is located relative to a position and view field RV of the image registering unit 115 such that the image registering unit 115 can only register a portion of the pattern LP1. The specific sub-selection of the pattern LP1 included in the image data $D_{img}$ is a position indicator correlated with the parameter P. Preferably, if the head-mountable structure 120 has not been calibrated to the image registering unit 115, the data processing unit 110 is configured to derive an absolute position P in the VR environment based on the sub-selection of the pattern LP1 that is included in the image data $D_{img}$. Moreover, in the absence of a calibration, the size of the elements in the pattern LP1 plus default assumptions concerning how tall the user U is and a typical height to the ceiling provides an initial value of an elevation measure $z_P$ for the position coordinate P in the VR environment.

In the example shown in FIG. 3, the image data $D_{img}$ registered by the image registering unit 115 also corresponds to a distortion of the pattern LP1. Here, the type and magnitude of the distortion indicates how the head-mountable structure 120 is oriented relative to the light-reflective surface 130 and the image registering unit 115. Again, if no calibration has been performed, the data processing unit 110 is preferably configured to derive an absolute direction D in the VR environment based on the type and magnitude of the distortion of the pattern LP1. Naturally, as mentioned above, there is generally no specific correspondence between the user's U physical position in the room and the parameters P and D in the VR environment. The initial assumptions for the parameters P and D therefore only constitute a starting point for presenting graphics data $D_{gr}$ representing a field-of view in the VR environment. Based on this initial point, the user U may then alter the parameters P and/or D by entering desired control commands Ctrl via the first input means 140. In practice, this may involve entering commands on a keyboard and/or manipulating an action button, a scroll wheel, a mouse, a touchpad, a joystick and/or a joy ball. Thus, the control commands Ctrl may specify moving the position P from which the field of view FoV is presented to the user U in at least one dimension X, Y and/or Z in the VR environment; rotating the direction D in which the field of view FoV is presented to the user U around at least one axis in the VR environment; and/or manipulating at least one object in the VR environment.

According to one embodiment of the invention, the first light source 125 is configured to emit light in the infrared spectrum. This is beneficial because thereby a human observer need not be distracted by the light (which is invisible to him/her). It is also relatively straightforward to adapt the image registering unit 115 to such light and render the registering comparatively insensitive to disturbance from other light sources.

Nevertheless, one commonly used strategy to reduce undesired influences from external light sources is to emit light in a periodic manner (e.g. altering between on and off according to a given pattern). Namely, thereby, ambient light recorded when light source is passive can be subtracted from the image data registered when the light source is active. According to one embodiment of the invention, however, the first light source 125 is configured to emit continuous light. This is advantageous because it enables a very simple and cost efficient design, where the image registering unit 115 need not be synchronized with the first light source 125.

This, in turn, further facilitates calculating the graphics data $D_{gr}$. According to one embodiment of the invention, the data processing unit 110 is configured to calculate the graphics data $D_{gr}$ in real time based on image data $D_{img}$ recorded by the image registering unit 115 at a single instance of time. Real time includes calculating the graphics data $D_{gr}$ based on image data $D_{img}$ recorded at multiple instances of time. This allows the system to extrapolate graphics data $D_{gr}$ to account for any latency from measuring the well-defined pattern from image data $D_{img}$, determining the position of the well-defined pattern and generating graphics data $D_{gr}$. Preferably the system may extrapolate graphics data approximately 50 ms into the future using approximately 3 instances of image data $D_{img}$, however other configurations would be readily understood by a person of skill in the art. In contrast to the prior-art solutions (which rely on relative measurements) this is possible because here each individual set of image data $D_{img}$ (i.e. data frame), as such, provides an absolute measure of a position and orientation of the user's head (or more precisely the head-mountable structure 120).

Figure 5:
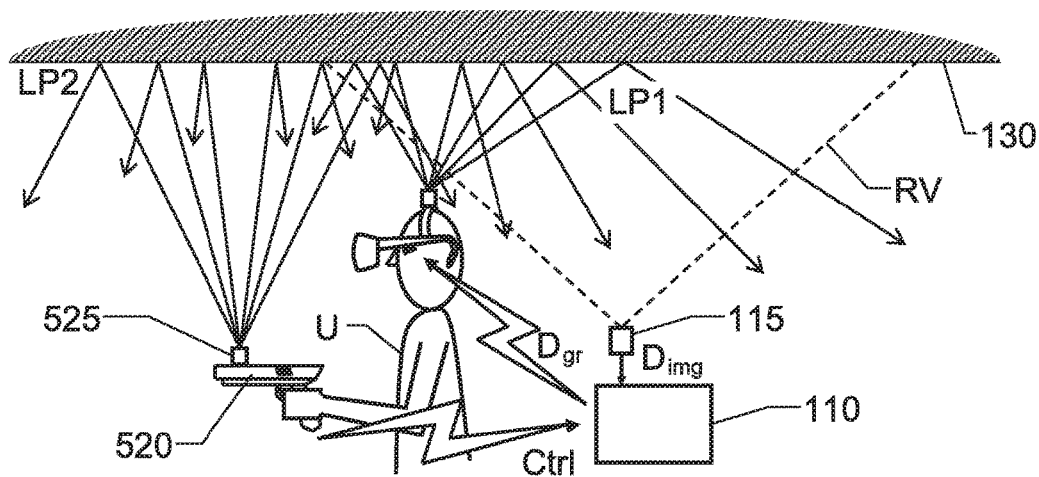
FIG. 5 shows a user interacting with a VR environment via a second input means and a head-mountable computer-graphics display structure according to one embodiment of the invention.

FIG. 5 shows a user U interacting with a VR environment via a second input means 520 and a head-mountable structure 120 communicatively connected to a data processing unit 110 according to one embodiment of the invention. Preferably, the second input means 520 and the head-mountable structure 120 are linked to the data processing unit 110 via a respective wireless communication resource.

The second input unit 520 contains a second light source 525, which is configured to project a second well-defined light pattern LP2 on the light-reflecting surface 130. The second well-defined light pattern LP2 is different from the first well-defined light pattern LP1 with respect to at least one parameter (e.g. color or shape), however otherwise has the same general characteristics. The image registering unit 115 is further configured to also record image data $D_{img}$ representing the second well-defined light pattern LP2, and based thereon, the data processing unit 110 is arranged to calculate at least one parameter for influencing of the VR environment. For example, analogous to the above discussion concerning the head-mountable structure 120, it is straightforward for the data processing unit 110 to calculate a position and direction of the second input unit 520.

Consequently, if for instance the second input unit 520 is a hand-carried pointing device representing a gun or similar weapon in the VR environment, the data processing unit may determine an aiming point for the gun. Further, if the user U generates a control command Ctrl specifying activation of the gun, the data processing unit 110 can calculate whether or not a given entity in the VR environment is hit.

One important advantage of various embodiments of the present invention compared to the prior-art solutions is that the head-mountable structure 120 (which is associated with the field of view FoV presented to the user U) and the second input unit 520 interact with the VR environment based on exactly the same reference system, namely the image data $D_{img}$ representing the light patterns LP1 and LP2 respectively on the light-reflecting surface 130. This means that there is no risk that there is misalignment between what the user U sees and what the second input unit 520 aims at. As mentioned above, no calibration to the VR environment is needed. This means that if for example the connection(s) to the data processing unit 110 is(are) temporarily disrupted, the head-mountable structure 120 and the second input unit 520 will automatically be coordinated to one another again as soon as the connection(s) is(are) reestablished.

It is also worth mentioning that an arbitrary number of second input units 520 can be added to the system at exceptionally low marginal cost. For example, second input units 520 representing shields, swords and other armory may be included. This, in turn, render it possible to simulate complex forms of interaction with the VR environment at very high authenticity.

Preferably, the data processing unit 110 contains, or is in communicative connection with a memory unit 112 storing a computer program product PP, which contains software for controlling the data processing unit 110 to perform the above-described actions when the computer program product PP is run on the data processing unit 110.

Figure 6:
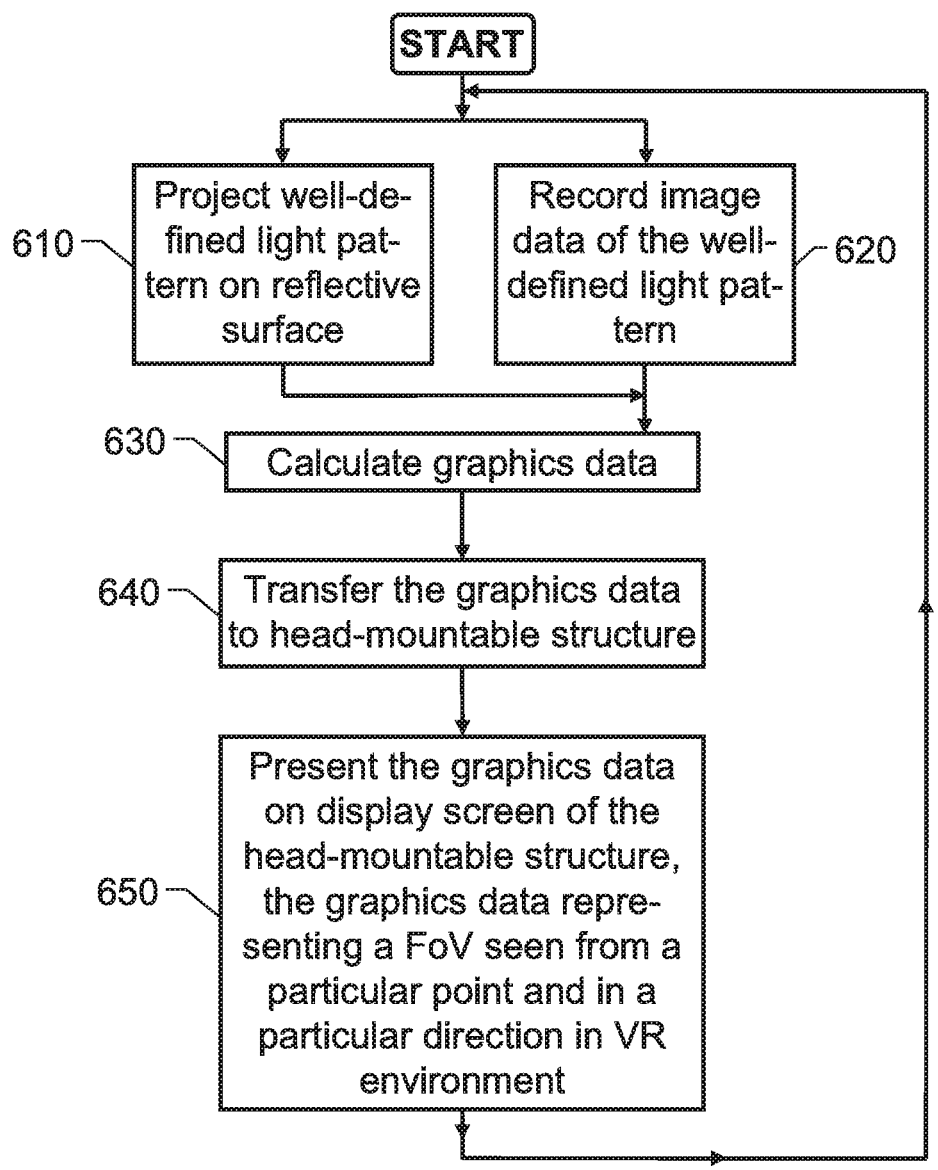
FIG. 6 illustrates, by means of a flow diagram, the general method according to one embodiment of the invention.

Referring to FIG. 6, we will now describe the general method for presenting computer graphics to a user according to one embodiment of the invention.

In a first step 610, a light source in the head-mountable structure 120 worn by the user U projects a first well-defined light pattern LP1 onto a light-reflecting surface 130, e.g. the ceiling of a room. In parallel with step 610, a step 620 records image data image data $D_{img}$ representing the first well-defined light pattern LP1 via an image registering unit 115 associated with a data processing unit 110.

Then, a step 630 calculates the graphics data $D_{gr}$ representing a field of view FoV as seen by the user U from a particular position P and in a particular direction D in the VR environment. More precisely, the graphics data $D_{gr}$ are determined based on knowledge of the first well-defined light pattern LP1, a comparison with the registered image data $D_{img}$ and which sub-selection and distortions of the first well-defined light pattern LP1 that the image data $D_{img}$ represent.

Thereafter, a step 640 transfers the graphics data $D_{gr}$ to the head-mountable structure 120, and a following step 650 presents the image data $D_{img}$ on the display screen 123 of the head-mountable structure 120.

Subsequently, the procedure loops back to steps 610 and 620.

Any reference to light reflecting surface or the like is intended to refer to any surface capable of reflecting or dispersing any amount of light. For example the surface may be specular in the manner of a mirror, or it may be diffuse in the manner of a ceiling. It is intended that the present invention functions adequately through reflection off most surfaces commonly found in a home or office environment. In certain embodiments, the present invention may also function through the light reflecting surface being retroreflective.

Embodiments of the present invention provides all the necessary components for determining the orientation, position and/or identity of a device or light source as previously described. This orientation, position and/or identity information is used to alter the graphics data $D_{gr}$. By way of example, the characteristics of a well-defined light pattern LP1 or LP2 may be used to determine the orientation, position or identity of a device. A well-defined light pattern having a certain plurality of elements may identify a particular device to the data processing unit 110. The arrangement and orientation of the plurality of elements may allow the data processing unit 110 to determine the position or orientation of the device or light source.

It is intended to be understood that embodiments of the present invention may require only a portion of a well-defined light pattern such as LP1 or LP2 to function. The image data $D_{img}$ may contain only a portion of a well-defined light pattern, and based on the configuration of the light pattern and its nonrepeating structure the data processing unit 110 may adequately determine graphics data $D_{gr}$.

All of the process steps, as well as any sub-sequence of steps, described with reference to FIG. 6 above may be controlled by means of a programmed computer apparatus. Moreover, although the embodiments of the invention described above with reference to the drawings comprise a computer apparatus and processes performed in a computer apparatus, embodiments of the invention thus also extend to computer programs, particularly computer programs on or in a carrier, adapted for putting embodiments of the invention into practice. The program may be in the form of source code, object code, a code intermediate source and object code such as in partially compiled form, or in any other form suitable for use in the implementation of the process according to some embodiments of the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof. Additionally, any detail discussed with regard to one embodiment may or may not be present in other version of that embodiment, or in other discussed embodiments.

Embodiments of the invention have now been described in detail for the purposes of clarity and understanding. However, it will be appreciated that certain changes and modifications may be practiced within the scope of the appended claims.

What is claimed is:

1. A computer graphics presentation system comprising:
a data processing unit configured to generate graphics data for presentation to a user,
at least one input unit, and
a head-mountable structure carrying a display, the head-mountable structure being in communicative connection with the data processing unit and configured to receive the graphics data from the data processing unit for presentation of the graphics data on the display, wherein:
the head-mountable structure comprises a light source configured to project a well-defined light pattern on a surface that is remote from the head-mountable structure, wherein the well-defined light pattern is projected in a direction from the head-mountable structure to the surface,
the data processing unit is associated with an image registering unit configured to record image data representing the well-defined light pattern, and
the data processing unit is arranged to calculate the graphics data based on the image data indicating an orientation of the well-defined light pattern, the graphics data representing a field of view in a virtual reality (VR) environment, the field of view having a position in the VR environment and a direction in the VR environment, wherein:
the graphics data representing the position of the field of view is calculated based on a selection of the well-defined light pattern included in the image data, and
the graphics data representing the direction of the field of view is calculated based on a distortion of the well-defined light pattern included in the image data.

2. The computer graphics presentation system according to claim 1, wherein the data processing unit is configured to calculate the graphics data further based on image data recorded by the image registering unit at a single instance of time.

3. The computer graphics presentation system according to claim 1, wherein the data processing unit is configured to calculate the graphics data further based on image data recorded by the image registering unit at multiple instances of time.

4. The computer graphics presentation system according to claim 1, wherein the at least one input unit is further configured to be manipulated by the user and in response thereto generate control commands for influencing the graphics data.

5. The computer graphics presentation system according to claim 1, wherein the at least one input unit is configured to project an additional well-defined light pattern on the surface, wherein the well-defined light pattern and the additional well-defined light patterns are different patterns.

6. The computer graphics presentation system according to claim 5, wherein:
the image registering unit is configured to record additional image data representing the additional well-defined light pattern, and
the data processing unit is arranged to calculate the graphics data further based on the additional image data representing the additional well-defined light pattern.

7. The computer graphics presentation system according to claim 1, wherein the at least one input unit comprises a device configured to generate the control commands in response to either how the input unit is positioned or how the input unit is oriented.

8. The computer graphics presentation system according to claim 1, wherein the at least one input unit contains an activator where upon activation a control command is generated.

9. The computer graphics presentation system according to claim 1, wherein the light source operates in a periodic manner.

10. The computer graphics presentation system according to claim 1, wherein the display and the light source are in a fixed position relative to each other.

11. A computer graphics presentation method comprising the steps of:
projecting a well-defined light pattern on a surface remote from the head-mountable structure,
recording image data representing the well-defined light pattern,
generating, based on the image data, graphics data representing a field of view in a virtual reality (VR) environment for presentation to a user on a display in a head-mountable structure, the field of view having a position in the VR environment and a direction in the VR environment, wherein:
the graphics data representing the position of the field of view is calculated based on a selection of the well-defined light pattern included in the image data, and
the graphics data representing the direction of the field of view is calculated based on a distortion of the well-defined light pattern included in the image data.

12. The computer graphics presentation method according to claim 11, wherein generating the graphics data is further based on image data recorded by the image registering unit at a single instance of time.

13. The computer graphics presentation method according to claim 11, wherein generating the graphics data is further based on image data recorded by the image registering unit at multiple instances of time.

14. The computer graphics presentation method according to claim 11, further comprising projecting an additional well-defined light pattern on the surface, wherein the well-defined light pattern and the additional well-defined light patterns are different patterns.

15. The computer graphics presentation method according to claim 11, wherein the step of generating graphics data is further based on a control command generated in response to how an input unit is positioned or oriented.

16. The computer graphics presentation method according to claim 11, wherein the step of generating graphics data is further based on a control command generated in response to an activation of an input unit.

17. The computer graphics presentation method according to claim 11, wherein the step of projecting a well-defined light pattern is conducted in a periodic manner.

18. An identification system comprising:
a light source configured to project a well-defined light pattern on a surface that is remote from the light source, wherein the light source is adjoined to a device, and the well-defined light pattern is projected in a direction from the device to the surface, and
an image registering unit, associated with a data processing unit, configured to record image data representing at least a portion of the first well-defined light pattern and at least a portion of the second well-defined light pattern, wherein the data processing unit is configured to:

calculate the graphics data based on the image data indicating an orientation of the well-defined light pattern, the graphics data representing a field of view in a virtual reality (VR) environment, the field of view having a position in the VR environment and a direction in the VR environment, wherein the graphics data representing the position of the field of view is calculated based on a selection of the well-defined light pattern included in the image data, and the graphics data representing the direction of the field of view is calculated based on a distortion of the well-defined light pattern included in the image data, and determine an identity of the device based on the well-defined light pattern.

19. The identification system according to claim 18, further comprising:

an additional light source configured to project an additional well-defined light pattern on the surface, wherein the additional light source is adjoined to an additional device, wherein the data processing unit is further configured to determine an identity of the additional device based on the additional well-defined light pattern.

20. The identification system according to claim 19, wherein the light source and the additional light source each emit infrared light.

* * * * *